United States Patent

[11] 3,615,300

[72] Inventors: Melvin M. Holm, Alameda; Paul E. Fischer, Lafayette, both of Calif.
[21] Appl. No.: 830,468
[22] Filed: June 4, 1969
[45] Patented: Oct. 26, 1971
[73] Assignee: Chevron Research Company, San Francisco, Calif.

[54] HYDROGEN PRODUCTION BY REACTION OF CARBON WITH STEAM AND OXYGEN
6 Claims, 1 Drawing Fig.

[52] U.S. Cl. .................................................. 48/206, 23/19 V, 23/140, 23/183, 23/212, 48/202, 48/204
[51] Int. Cl. ........................................................ C10j 3/16
[50] Field of Search ........................................... 48/204, 206, 202, 197; 252/373; 23/212, 212 A, 212 B

[56] References Cited
UNITED STATES PATENTS

| | | | |
|---|---|---|---|
| 1,505,065 | 8/1924 | West et al. ................. | 48/204 |
| 1,926,587 | 9/1933 | Hansgvig ................... | 23/212 |
| 2,436,938 | 3/1948 | Scharmann et al. ...... | 48/204 X |
| 3,004,839 | 10/1961 | Tornquist .................. | 48/197 |
| 3,188,179 | 6/1965 | Gorin ........................ | 23/212 |

Primary Examiner—Joseph Scovronek
Attorneys—A. L. Snow, F. E. Johnston, C. J. Tonkin and T. G. De Jonghe ABSTRACT: A process for producing a hydrogen-rich gas mixture which is lean in CO and $CH_4$ relative to $CO_2$ which comprises:
a. contacting subdivided carbonaceous matter with steam and oxygen in a reaction zone at temperatures between about 800° F. and 1,350° F. to form $H_2$ and $CO_2$,
b. maintaining the temperatures in the reaction zone within 100° F. of the average temperature for the reaction zone,
c. withdrawing the hydrogen-rich gas mixture from the reaction zone, and
d. feeding sufficient steam to the reaction zone so that the hydrogen-rich gas mixture which is withdrawn from the reaction zone contains at least 60 volume percent steam.

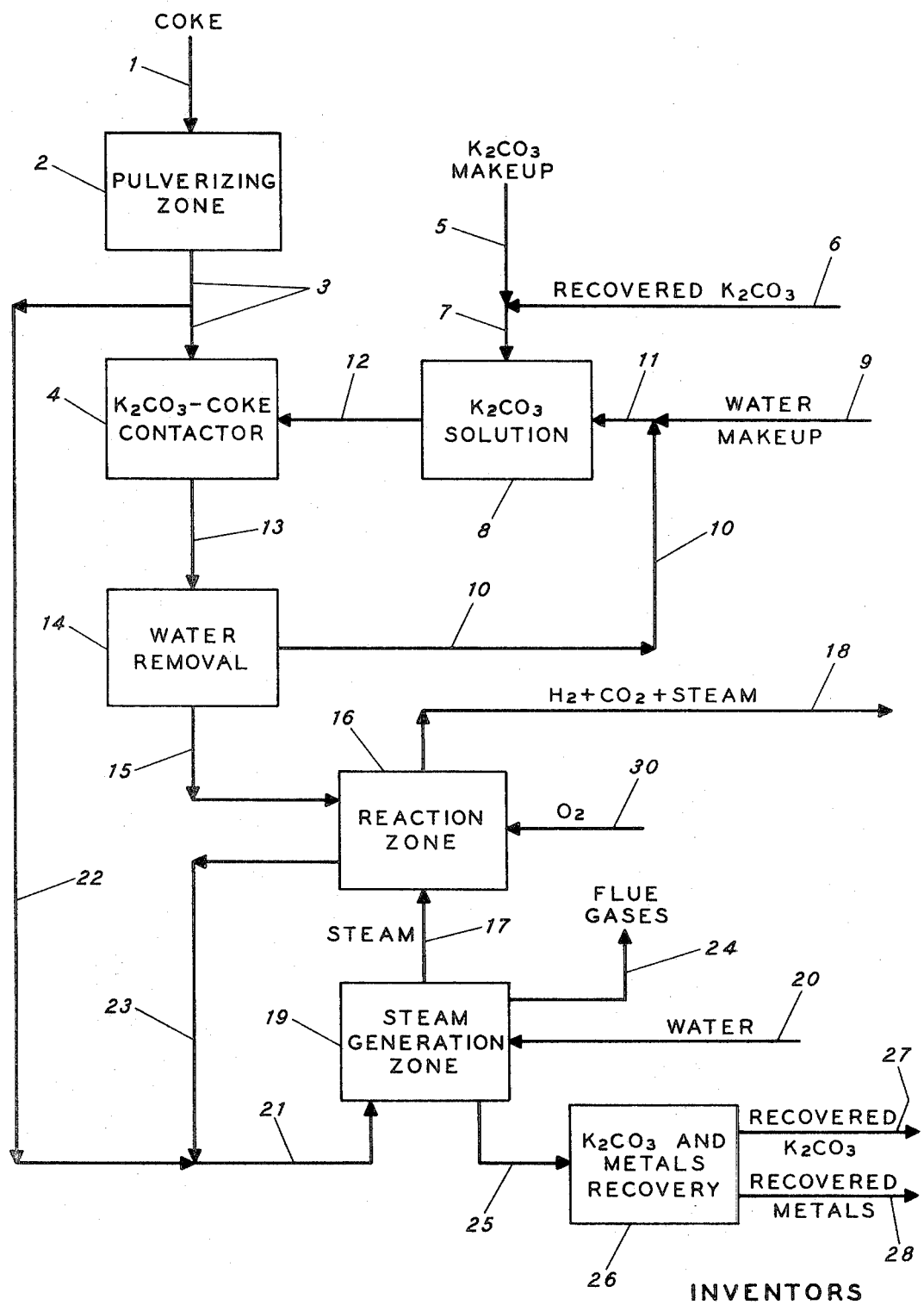

HYDROGEN PRODUCTION BY REACTION OF CARBON WITH STEAM AND OXYGEN

BACKGROUND OF THE INVENTION

1. Field of the Invention

The present invention relates to the production of a hydrogen-rich gas; more particularly, the present invention relates to the production of an $H_2$–$CO_2$ gas mixture in a process wherein steam and oxygen are reacted with carbonaceous matter. Our application Ser. No. 830,469 titled "Hydrogen Production by Reaction of Carbon with Steam," filed on June 4, 1969, relates to a hydrogen production process somewhat similar to the process of the present patent application, and the disclosure of the aforesaid patent application is hereby incorporated by reference to the present patent application.

2. Description of the Prior Art

Various methods have been suggested for the production of hydrogen-rich gas mixtures. Among these methods are steam-hydrocarbon reforming, partial oxidation of hydrocarbons, Lurgi heavy hydrocarbon gasification, the traditional steam, red-hot coke reaction, and modified methods of reacting carbonaceous matter with steam and oxygen, such as described in U.S. Pat. No. 1,505,065.

The two leading processes, that is the two processes which are most frequently used to generate hydrogen, are steam-hydrocarbon reforming and partial oxidation of hydrocarbons.

In typical steam reforming processes, hydrocarbon feed is pretreated to remove sulfur compounds which are poisons to the reforming catalyst. The desulfurized feed is mixed with steam and then is passed through tubes containing a nickel catalyst. While passing through the catalyst-filled tubes most of the hydrocarbons react with steam to form hydrogen and carbon oxides. The tubes containing the catalyst are located in a reforming furnace, which furnace heats the reactants in the tubes to temperatures of 1,200°–1,700° F. Pressures maintained in the reforming furnace tubes range from atmospheric to 450 p.s.i.g. If a secondary reforming furnace or reactor is employed, pressures used for reforming may be as high as 450 p.s.i.g. to 700 p.s.i.g. In secondary reformer reactors, part of the hydrocarbons in the effluent from the primary reformer is burned with oxygen. Because of the added expense, secondary reformers are generally not used in hydrogen manufacture but are used where it is desirable to obtain a mixture of $H_2$ and $N_2$, as in ammonia manufacture. The basic reactions in the steam reforming process are:

$$C_nH_{2n+2} + nH_2O \rightleftharpoons nCO + (2n+1)H_2$$
$$C_nH_{2n+2} + 2nH_2O \rightleftharpoons nCO_2 + (3n+1)H_2$$

e.g., methane-steam:

$$CH_4 + H_2O \rightleftharpoons CO + 3H_2; \text{ and}$$
$$CH_4 + 2H_2O \rightleftharpoons CO_2 + 4H_2$$

Because the hydrogen product is used in high-pressure processes, it is advantageous to operate at high pressure to avoid high compression requirements. However, high pressures are adverse to the equilibrium; and higher temperatures must be employed. Consistent with hydrogen purity requirements of about 95 to 97 volume percent $H_2$ in the final $H_2$ product, and consistent with present metallurgical limitations, generally single stage reforming is limited commercially to about 1,550° F. and 300 p.s.i.g.

In typical partial oxidation processes, a hydrocarbon is reacted with oxygen to yield hydrogen and CO. Insufficient oxygen for complete combustion is used. The reaction may be carried out with gaseous hydrocarbons or liquid or solid hydrocarbons, for example, with methane, the reaction is:

$$CH_4 + 1/2 O_2 \rightleftharpoons 2H_2 + CO$$

With heavier hydrocarbons, the reaction may be represented as follows:

$$C_7H_{12} + 2.8 O_2 + 2.1 H_2O \rightleftharpoons 6.3 CO + 0.7 CO_2 + 8.1 H_2$$

Both catalytic and noncatalytic partial oxidation processes are in use. Suitable operating conditions include temperatures from 2,000° F. up to about 3,200° F. and pressures up to about 1,200 p.s.i.g., but generally pressures between 100 and 600 p.s.i.g. are used. Various specific partial oxidation processes are commercially available, such as the Shell Gasification Process, Fauser-Montecatini Process, and the Texaco Partial Oxidation Process.

There is substantial CO in the hydrogen-rich gas generated by either reforming or partial oxidation. To convert the CO to $H_2$ and $CO_2$, one or more CO shift conversion stages are typically employed. The CO shift conversion reaction is:

$$CO + H_2O \rightarrow H_2 + CO_2$$

This reaction is typically effected by passing the CO and $H_2O$ over a catalyst such as iron oxide activated with chromium.

Typical analyses for hydrogen-rich gas mixtures produced by steam reforming, partial oxidation and the other hydrogen production processes previously referred to are given in table 1, page 5.

In all processes represented in table 1 it can be seen that considerable CO is produced relative to $CO_2$. It can be seen from table 1 that none of the processes has a ratio of $CO_2$ to CO greater than 2 in the raw hydrogen-rich gas mixture produced. The CO which is present in the raw hydrogen-rich gas typically is shift converted to obtain additional $H_2$ and $CO_2$, as mentioned previously in the discussion of the steam reforming and partial oxidation processes. $CO_2$ is more easily removed from hydrogen than is CO. Also, it can be readily seen from the reactions $$C + 2H_2O \rightarrow CO_2 + 2H_2$$
$$C + H_2O \rightarrow CO + H_2$$

that more hydrogen is produced when carbon is oxidized fully to obtain $CO_2$, rather than partially to obtain CO. Similarly, more hydrogen is produced when hydrocarbons are oxidized completely to form $CO_2$ and $H_2$ rather than partially to form CO and $H_2$.

As indicated by table 1, U.S. Pat. No. 1,505,065 relates to a process wherein steam and oxygen are reacted in a reaction apparatus with carbonaceous matter to obtain a hydrogen-rich gas mixture. It is stated in that patent that a low temperature favors the production of carbon dioxide, but yet that the temperature must be sufficiently high to enable the reaction to proceed at the desired rate. The hydrogen-rich gas mixture which is obtained according to the processes disclosed in U.S. Pat. No. 1,505,065 has a $CO_2$ to CO ratio of 1.5.

U.S. Pat. No. 1,505,065 also states that the production of carbon dioxide at a given temperature, pursuant to the reaction $$CO + H_2O \rightarrow H_2 + CO_2,$$

is favored by the presence of an excess of steam above the

TABLE 1.—HYDROGEN PRODUCTION PROCESSES

| | Steam-hydrocarbon reforming | Partial oxidation | Lurgi heavy hydrocarbon gasification | Steam, red-hot coke | U.S. Pat. 1,505,065 |
|---|---|---|---|---|---|
| $H_2$, volume percent | 74.2 | 44.5 | 39.4 | 50 | 47 |
| CO, volume percent | 11.5 | 49 | 16.4 | 49 | 12 |
| $CO_2$, volume percent | 11.7 | 5.3 | 32.3 | 1 | 18 |
| $N_2$, volume percent | 0.3 | 0.4 | 0.4 | | 23 |
| $CH_4$, volume percent | 2.2 | 0.6 | 11.3 | | |
| Volume ratio, number $CO_2/CO$ | 1 | 0.1 | 2 | 0.02 | 1.5 |
| Volume ratio, number $CO_2/CH_4$ | 5.3 | 9 | 2.9 | | |
| Oxidant | Steam | (1) | (1) | Steam | (2) |
| Hydrogen gas withdrawal temperature,° F | 1,525 | 2,700 | 1,800 | 2,730–3,270 | 1,112–1,382 |

[1] Steam plus $O_2$.
[2] Steam plus air.

amount of steam which actually reacts with the carbonaceous matter. The amount of steam used according to the process disclosed in U.S. Pat. No. 1,505,065 is about 3 to 5 pounds per pound of carbon gasified. On a nitrogen-free basis, the upper limit (5 pounds per pound of carbon gasified) of the amount of steam used according to the disclosure of U.S. Pat. No. 1,505,065 would result in about 42 volume percent steam in the hydrogen-rich gas which is produced. Using 23 volume percent nitrogen as the nitrogen content of the hydrogen-rich gas produced according to the process of U.S. Pat. No. 1,505,065, the percent steam in the hydrogen-rich gas produced is about 33 volume percent.

U.S. Pat. No. 1,505,065 does not disclose the use of excess steam to minimize the methane content of the hydrogen-rich gas mixture which is produced.

SUMMARY OF THE INVENTION

According to the invention, a process is provided for producing a hydrogen-rich mixture which is lean in CO and $CH_4$ relative to $CO_2$ which comprises:

a. contacting subdivided carbonaceous matter with steam and oxygen in a reaction zone at temperatures between about 800° F. and 1,350° F. to form $H_2$ and $CO_2$, b. maintaining the temperatures in the reaction zone within 100° F. of an average temperature for the reaction zone, c. withdrawing the hydrogen-rich gas mixture from the reaction zone, and d. feeding sufficient steam to the reaction zone so that the hydrogen-rich gas mixture which is withdrawn from the reaction zone contains at least 60 volume percent steam.

The present invention is based partly upon the finding and determination that a hydrogen-rich gas which is relatively lean in methane, and also relatively lean in carbon monoxide, can be produced if carbon is reacted with steam at a relatively low and substantially uniform temperature and a sufficient amount of steam is fed into the reaction zone, so that the hydrogen-rich gas mixture which is withdrawn from the reaction zone contains at least X60 volume percent steam. Preferably the substantially uniform temperatures are maintained in the reaction zone by distributing the oxygen throughout the reaction zone, so that temperature gradients in the reaction zone are minimized. Usually the temperatures are maintained within plus or minus 100° F. of the arithmetic average temperature for the reaction zone. The arithmetic average temperature for the reaction zone is determined, for example, by taking five temperature readings at evenly spaced positions along the vertical axis length of the zone, or reactor, where the carbon-steam reaction is taking place.

Because the reaction is an endothermic reaction, heat is required to maintain the elevated temperature in the reaction zone. According to the processes in the present invention, this heat is supplied, at least in part, by the reaction of oxygen with carbonaceous matter in the reaction zone.

The primary reaction in the reaction zone is the generation of hydrogen according to the endothermic reaction:

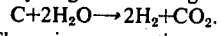
$C + 2H_2O \rightarrow 2H_2 + CO_2$.

The primary reaction to generate the necessary heat for the above endothermic reaction is

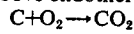
$C + O_2 \rightarrow CO_2$

However, if the hydrocarbons are present in the carbonaceous matter fed to the reaction zone, as is usually the case, then the reaction of the oxygen to generate heat will also result in the generation of $H_2O$, as for example, according to the reaction

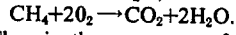
$CH_4 + 2O_2 \rightarrow CO_2 + 2H_2O$.

Thus in the processes of the present invention, the oxygen which is fed to the reaction zone supplies not only heat for reaction of oxygen the carbon-steam reaction but also supplies hot steam when hydrocarbons are present in the carbonaceous feed to the reaction zone.

The present invention differs from our application Ser. No. 850,469 titled "HYDROGEN PRODUCTION BY REACTION OF CARBON WITH STEAM," filed on June 4, 1969, inasmuch as in that application steam is contemplated as the heat source for the endothermic carbon-steam reaction, whereas in the present application oxygen is required to burn at least a portion of the carbonaceous matter in the reaction zone to provide the heat for the carbon steam reaction. Also, according to the present invention, temperatures in the reaction zone are maintained within a relatively narrow range. The relatively narrow and substantially uniform temperatures maintained in the reaction zone according to the process of the present invention result in low CO production relative to $CO_2$.

According to the process of the present invention, a sufficiently large quantity of steam is fed to the reaction zone so that the hydrogen-rich gas mixture which is withdrawn from the reaction zone contains at least 60 volume percent steam. The large excess of steam, coupled with the relatively low temperatures maintained in the reaction zone, results in the production of a hydrogen-rich gas mixture which is lean in $CH_4$, as well as CO, relative to $CO_2$.

In the process of the present invention it is preferred to contact the subdivided carbonaceous matter with steam and oxygen in the reaction zone at temperatures below 1,350° F., as, for example, at temperatures between about 800° and 1,100° F. However at these low temperatures the reaction rate of carbon with steam to form hydrogen is slow relative to higher temperatures, as, for example, 1,500° F. typically used in steam-methane reforming or 2,700° F. typically used in partial oxidation process or about 3,000° F. typically used in hydrogen production by steam-coke reactions. Contrariwise, according to a preferred embodiment of the present invention, relatively low temperatures (800° to 1,100° F.) are employed and a satisfactory quantity of hydrogen is produced per unit time for commercial purposes by using a large mass of carbonaceous matter in the reaction zone. Thus, in this preferred embodiment of the present invention, it is preferred to maintain the temperature in the reaction zone between about 1,000° F. and 1,100° F., and to use about 15,000 cubic feet of subdivided carbonaceous matter so that at least 500,000 standard cubic feet per day (SCFD) of hydrogen are produced. STill more preferably, at least about 300,000 cubic feet of carbonaceous matter are maintained in the reaction zone so as to produce 10,000,000 SCFD of hydrogen. The larger hydrogen production rate results in an overall more economical hydrogen plant, from the standpoint of both investment and operating cost per unit quantity of hydrogen produced.

In the process of the present invention the temperatures are maintained sufficiently low in the reaction zone and/or sufficient steam is fed to the reaction zone so that the hydrogen-rich gas mixture which is withdrawn from the reaction zone is relatively lean in both $CH_4$ and CO. Preferably, the temperature and steam are adjusted so that the ratio of $CO_2$ to $CH_4$ is at least X2.5 and the ratio of $CO_2$ to CO is at least 2.5. More preferably, the temperature and steam are adjusted so that the ratio of $CO_2$ to $CH_4$ is at least X4.0 and the ratio of $CO_2$ to CO is at least 4.0.

In the process of the present invention wherein carbon is reacted with steam to form hydrogen, it has been determined that various alkaline carbonates act as catalysts to speed up the rate of reaction. In a preferred embodiment of the present invention, the carbonaceous matter which is contacted with steam and oxygen in the reaction zone is a residue material from a process wherein hydrocarbons are extracted from coal, said residue material containing an alkaline material such as $K_2COX_3$. Numerous processes have been proposed for use in the United States and one or more processes have been used in Western Germany for the conversion of coal to liquid hydrocarbons. In these processes a residue is obtained which has a low hydrogen content, a relatively high carbon content, and a substantial metals content. Also, almost all coals contain an appreciable quantity of alkaline materials which is present in the residue from coal conversion processes. Among these alkaline materials $K_2CO_3$ is prominent, and $K_2CO_3$ has been found to be a particularly good catalyst for the steam-hydrocarbon reaction as carried out in the process of the present invention.

According to the preferred embodiment of the present invention, a residue from a coal extraction process is used as the carbonaceous feed to the steam-carbon reaction zone, and the hydrogen which is generated is in turn used within the coal extraction process. The hydrogen is used in the overall coal extraction process to hydrogenate the coal and coal products, in order to obtain from the coal a substantial yield of valuable hydrocarbon products from the coal such as gasoline and fuel oil. This particular preferred embodiment is advantageous not only because the typically 20 percent-by-weight carbonaceous residue from a coal extraction process contains inherent catalytic material for the carbon-steam reaction of the present invention, but, also, because the residue from the coal extraction process is obtained in a finely subdivided condition, and, thus, in a reasonably reactive condition without providing further pulverizing; also, because a relatively large portion of hydrogen, on the order of 5,000 cubic feet per barrel of coal extract, is required to convert the coal extract to marketable liquid fuel products.

BRIEF DESCRIPTION OF THE DRAWING

The drawing is a schematic process-flow diagram of the process of the present invention wherein carbonaceous matter is reacted with steam and oxygen to provide an $H_2$–$CO_2$ gas mixture.

DETAILED DESCRIPTION OF THE DRAWING

Referring now in more detail to the drawing, coke is introduced via line 1 to pulverizing zone 2. Various other feeds may be used instead of coke, such as coal or other solid carbonaceous matter. By carbonaceous matter is meant any substance containing carbon, either in the amorphous or crystalline carbon state and/or as hydrocarbon compounds. Petroleum coke is particularly preferred feed. The pulverizing zone grinds the solid code to small particles, preferably 8 to 42 Tyler mesh size, and more preferably 100 to 200 mesh size. The smaller mesh sizes have been found by experimental work to result in a considerably faster reaction rate when steam is contacted with the particles at elevated temperature.

For an example case, about 1,300 tons per day of coke are fed to pulverizing zone 2 and about 820 tons per day of coke are passed to $K_2CO_3$ — coke contacting zone 4. In zone 4 the finely subdivided carbonaceous matter is impregnated with $K_2CO_3$ added in aqueous solution form to zone 4 via line 12. The aqueous solution of $K_2CO_3$ is made up in zone 8. Makeup $K_2CO_3$ via line 5 and recovered $K_2CO_3$ via line 6 are combined and introduced in zone 8 via line 7. Recycle water via line 10 and water makeup via line 9 are combined and added to zone 8 via line 11.

The finely divided coke particles which have been impregnated with $K_2CO_3$ are withdrawn from zone 4 via line 13 in an aqueous slurry form. Water is separated from the slurry in water-removal zone 14. The water which is removed is recycled via line 10 to be used again in forming the aqueous solution of $K_2CO_3$. The finely divided coke particles impregnated with $K_2CO_3$ are withdrawn via line 15 from water-removal zone 14 substantially free of excess water. The coke particles are fed to reaction zone 16, wherein they are reacted with steam introduced to reaction zone 16 via line 17.

Oxygen is added to reaction zone 16 via line 30. In reaction zone 16 the oxygen reacts with carbonaceous matter to provide heat, for example, according to the reaction $$C + O_2 \rightarrow CO_2.$$

The oxygen is distributed in the reaction zone by means of a mechanical inlet distributor and/or by means of turbulence maintained within the reaction zone. In the process of the present invention, it is preferred to introduce the oxygen to the steam-carbon reaction zone by means of a distributor having multiple oxygen-outlet nozzles. In addition, preferably the reaction zone is comprised of a fluidized system with upward-flowing vapors and gases, including steam, maintaining the finely divided carbonaceous particles in a fluidized and turbulent state. With the finely divided carbonaceous particles in a fluidized state, uniform mixing is more readily achieved in the reaction zone, so that a relatively uniform and relatively low reaction temperature may be maintained, even though carbon and also hydrocarbons are being burned in the reaction zone by reaction with oxygen.

The $K_2CO_3$ which was previously impregnated into the fine coke particles has a catalytic effect on the reaction $$C + H_2O \rightarrow H_2 + CO.$$

Other alkaline carbonates also have been determined to have a catalytic effect on the above reaction. Alkaline carbonates are frequently present in coal and coke and other carbonaceous matter in appreciable concentrations such as 2-to –5 weight percent. Thus, in many instances the process of the present invention can be carried out catalytically but yet without adding any makeup catalysts.

The hydrogen-rich stream which is produced in reaction zone 16 is withdrawn in line 18 from the reaction, together with a large amount of unreacted steam in accordance with the process of the present invention.

The steam which is fed to reaction zone 16 in large quantities is generated in steam generation zone 19. Steam generation zone 19 operates essentially in accordance with well-known procedures normally used for a boiler plant. Water is added to steam generation zone 19 via line 20 and vaporized to form steam at a temperature of about 1,500° F. to 1,800° F. The hot steam is withdrawn in line 17.

According to a preferred embodiment of the present invention, heating fuel for the steam generation zone is provided, in part, by using a portion of the coke withdrawn via line 22 from pulverizing zone 2. In some instances it is economically preferable to omit pulverizing the coke which is used as a fuel for steam generation zone 19. However, in the preferred embodiment illustrated by FIG. 1, 480 tons per day of pulverized coke are fed to steam generation zone 19 via lines 3, 22 and 21. This 480 tons per day of coke are augmented by 108 tons per day of unreacted carbonaceous matter (together with metallic ash and $K_2CO_3$) withdrawn from reaction zone 16 via line 23.

After burning, the coke and unreacted carbonaceous matter comprised of $K_2CO_3$ and metals (or ash) are left. This residue is withdrawn from steam generation zone 19 via line 25 and is passed to $K_2CO_3$ and metals recovery zone 26. In zone 26, $K_2CO_3$ is separated and withdrawn via line 27. The $K_2CO_3$ may then be recycled to zone 8 via line 6.

Metals such as vanadium and nickel are removed in the oxide form from zone 26 via line 28. The stream of recovered metals may be subjected to further processing to obtain satisfactory separation of valuable metals, or metal compounds, from less valuable ash constituents. Because hydrogen is advantageously produced in the process of the present invention from "heavyX" carbonaceous matter such as coal, coke or petroleum residue, the overall process of the present invention affords an attractive process to recover metals from various carbonaceous materials. Metals are recovered both from coke fed to the steam generation zone from the pulverizing zone and from unreacted material withdrawn via line 23 from reaction zone 16.

Referring once again to reaction zone 16, example numbers for a preferred embodiment of the present invention include the following: the coke fed to reaction zone 16 preferably contains about 0.2 pounds of the catalytic agent $K_2CO_3$ per 0.8 pounds of coke. It is preferred to carry out the reaction using a large volume of coke so that large quantities of hydrogen-rich gas can be generated at relatively low temperatures. Thus, on a basis of 820 tons per day of $K_2CO_3$ free coke, two reactors, each 20 feet in diameter by 64 feet long, are required in this preferred embodiment wherein 100 million SCFD of hydrogen are produced. The reactors are operated at an internal pressure of approximately 250 p.s.i.g. Heat required per pound of carbon reacted, in accordance with the endothermic steam-carbon reaction employed in the process of the present invention, is about 3,600 B.t.u.s per pound of carbon reacted. To furnish the required heat, about 740,000 per pounds per hour of steam are added to the reactor vessels at a temperature of about 1,680° F. The temperature and the amount of steam are selected so that there will be at least 60 volume percent steam in the hydrogen-rich gas withdrawn from the reactors, and so that the temperature at which the hydrogen-rich gas is withdrawn is between 800° F. and 1,200° . In this particular instance there is about 67 volume percent steam in the hydrogen-rich gas withdrawn from reaction zone 16, and the temperature of the hydrogen-rich gas which is withdrawn is about 1,200° F.

Although various specific embodiments of the invention have been described and shown, it is to be understood they are meant to be illustrative only and not limiting. Certain features may be changed without departing from the spirit or essence of the invention. It is apparent that the present invention has broad application to the production of hydrogen-carbon dioxide gas mixtures. Accordingly, the invention is not to be construed as limited to the specific embodiments illustrated but only as defined in the appended claims.

We claim:

1. A process for producing a hydrogen-rich gas mixture which is lean in CO and $CH_4$ relative to $CO_2$ and having a ratio of $CO_2$ to $CH_4$ of at least 2.5 and a ratio of $CO_2$ to CO of at least 2.5 which comprises:
   a. contacting subdivided carbonaceous matter with steam and oxygen in a reaction zone at temperatures between about 800° and 1,350°X F. to form $H_2$ and $CO_2$,
   b. maintaining the temperatures in the reaction zone within 100° F. of the average temperature for the reaction zone,
   c. withdrawing the hydrogen-rich gas mixture from the reaction zone, and
   d. feeding sufficient steam to the reaction zone so that the hydrogen-rich gas mixture which is withdrawn from the reaction zone contains at least 60 volume percent steam.

2. A process in accordance with claim 1 wherein sufficient steam is fed to the reaction zone so that the hydrogen-rich gas mixture which is withdrawn from the reaction zone has a ratio of $CO_2$ to $CH_4$ of at least 4.0 and a ratio of $CO_2$ to CO of at least 4.0.

3. A process in accordance with claim 1 wherein the subdivided carbonaceous matter is contacted with steam and oxygen in the reaction zone at temperatures between about 800° and 1,100° F.

4. A process in accordance with claim 3 wherein sufficient steam is fed to the reaction zone so that the hydrogen-rich gas mixture which is withdrawn from the reaction zone has a ratio of $CO_2$ to $CH_4$ of at least 4.0 and a ratio of $CO_2$ to CO of at least 4.0.

5. A process for producing a hydrogen-rich gas mixture which is lean in $CO_2$ and $CH_4$ relative to $CO_2$ which comprises:
   a. contacting subdivided carbonaceous matter with steam and oxygen in a reaction zone at temperatures between 800° and 1,100° F.,
   b. maintaining the temperatures in the reaction zone within 100° F. of the average temperature for the reaction zone,
   c. withdrawing the hydrogen-rich gas mixture from the reaction zone, and
   d. feeding sufficient steam to the reaction zone so that the hydrogen-rich gas mixture which is withdrawn from the reaction zone has a ratio of $CO_2$ to $CH_4$ of at least 2.5 and a ratio of $CO_2$ to CO of at least 2.5.

6. A process in accordance with claim 5 wherein at least about 300,000 cubic feet of subdivided carbonaceous matter is maintained in the reaction zone.